March 28, 1950 F. J. HAUER Re. 23,214

CARBON-SET FORM

Original Filed Dec. 8, 1945 2 Sheets-Sheet 1

INVENTOR
FRANK J. HAUER
BY
Toulmin & Toulmin
ATTORNEYS

March 28, 1950 F. J. HAUER Re. 23,214

CARBON-SET FORM

Original Filed Dec. 8, 1945 2 Sheets-Sheet 2

INVENTOR
FRANK J. HAUER
BY Toulmin & Toulmin
ATTORNEY

Reissued Mar. 28, 1950

Re. 23,214

UNITED STATES PATENT OFFICE 23,214

CARBON-SET FORM

Frank J. Hauer, Dayton, Ohio

Original No. 2,455,484, dated December 7, 1948, Serial No. 633,727, December 8, 1945. Application for reissue January 4, 1949, Serial No. 69,141

7 Claims. (Cl. 282—22)

Matter enclosed in heavy brackets [ ] appears in the original patent but forms no part of this reissue specification; matter printed in italics indicates the additions made by reissue This invention relates to writing forms and particularly to a carbon set form comprising a sheet of writing paper in combination with a carbon transfer sheet.

The particular object of this invention is to provide an improved means for making carbon copies of written or printed material.

Another object is to provide a carbon sheet in combination with a copy sheet which is more easily inserted into and removed from a typewriter or other machine.

Still another object is to provide a form consisting of a sheet of paper and a carbon sheet attached thereto in which the carbon sheet may readily be removed by the operator without the paper sheet becoming smudged.

Still another object is to provide a set form consisting of a sheet of paper and a carbon transfer sheet attached thereto by adhesive from which the carbon sheet may readily be detached and used as a shield when it is necessary to make an erasure.

These and other objects and advantages will become more apparent upon reference to the following specification taken together with the accompanying drawings in which.

Figure 1:
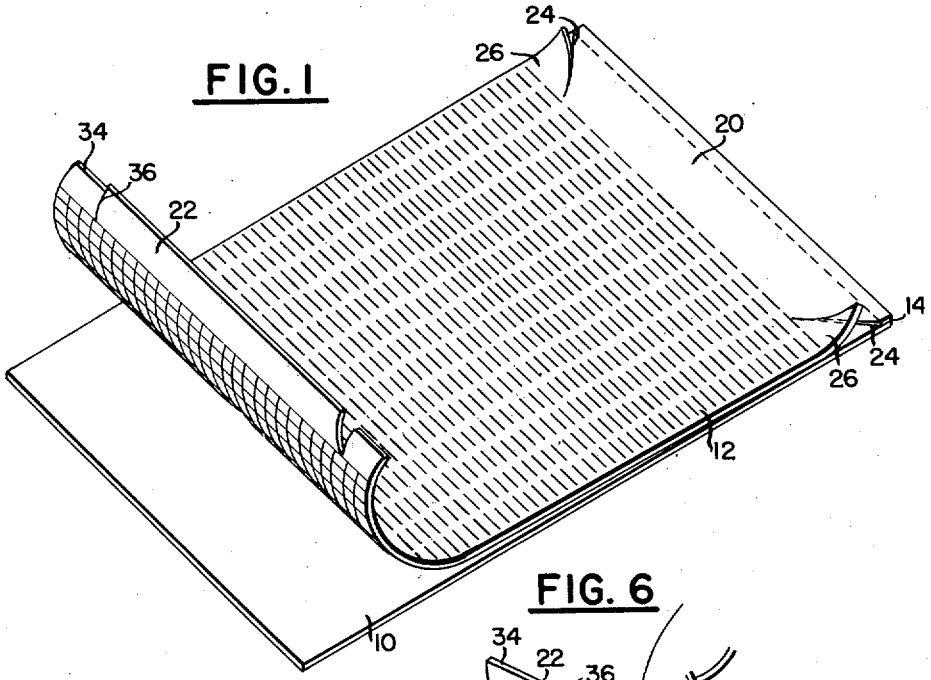
Figure 1 is a perspective view showing the improved set form of my invention.
Figure 8:
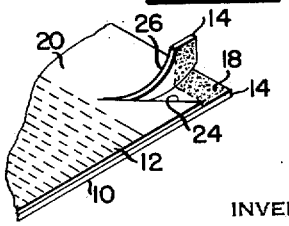
Figures 7 and 8 are fragmentary views showing manners in which the sheets may be secured together by adhesive.
Figure 7:
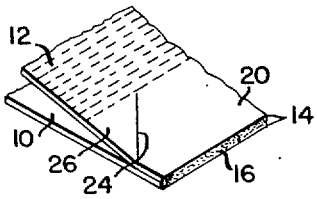

Referring to the drawings, and particularly to Figure 1, there is illustrated a sheet of paper at 10 which may be of any standard size such as letter size and which has associated therewith a carbon sheet 12. The sheets are secured together along their upper edges 14 by suitable adhesive means such as at 16 in Figure 7 or at 18 in Figure 8.

The carbon sheet is coated on the side adjacent the paper for transferring printed matter thereto and includes an uncoated margin 20 adjacent the upper edge and the uncoated margin 22 adjacent the lower edge. The coated portion between the margins 20 and 22 is amply sufficient for all ordinary writing requirements.

Extending inwardly from the sides of the carbon sheet and at an angle of about 75°, there are a pair of cuts or incisions 24 that lie within the uncoated margin 20. The purpose of the incisions 24 is to permit the operator to detach the carbon sheet 12 from the sheet 10 when the form is in a machine for the purpose of making erasures. This is accomplished by placing the thumb on one of the tabs indicated at 26 which are formed by the incisions 24 and thereafter passing the thumb between the sheets along the adhesive strip. It will be noted that this operation can be accomplished without the operator coming into contact with the coated surface of the carbon paper and without the sheet 10 becoming smudged by the paper.

Figure 2:
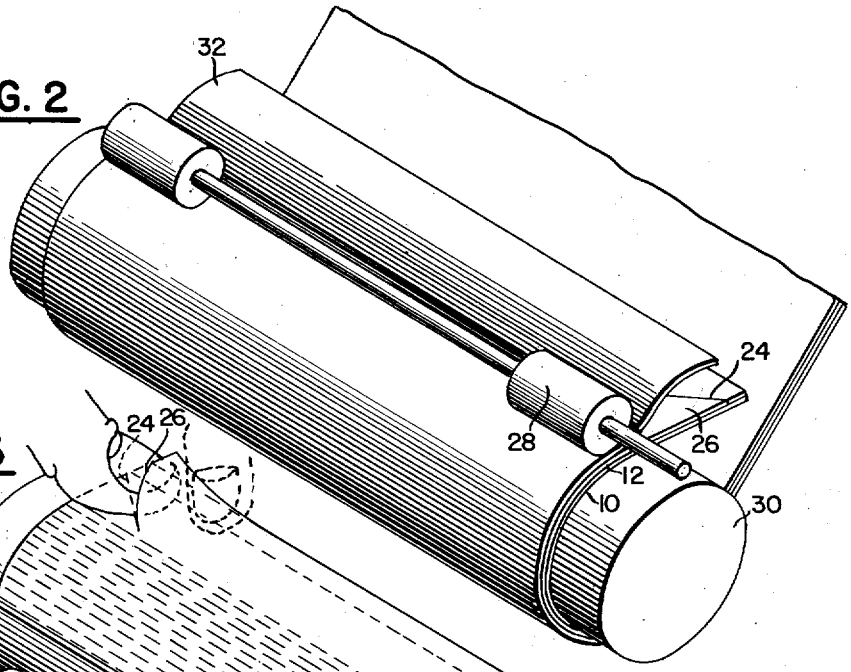
Figure 2 is a view showing a typing machine having an original sheet and the set form of this invention mounted therein.
Figure 3:
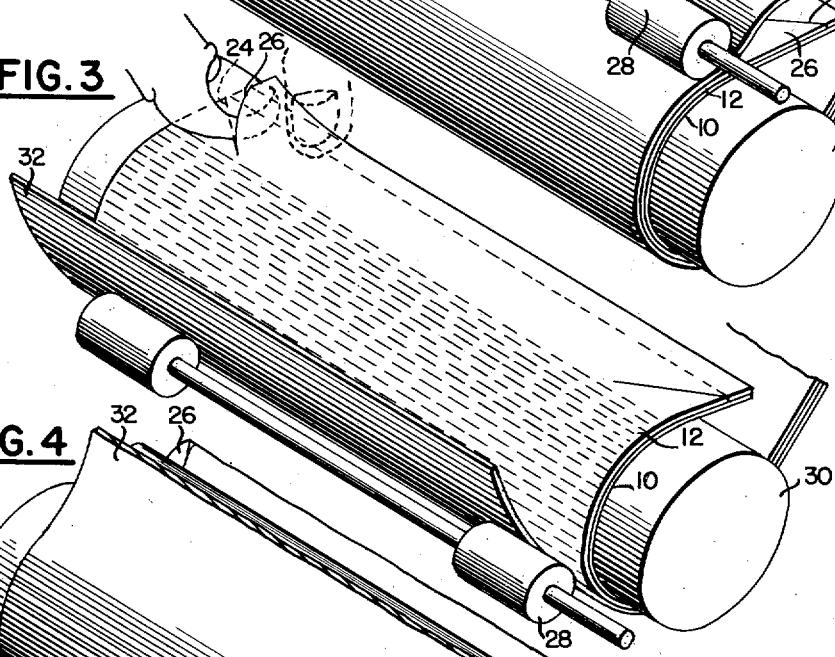
Figure 3 is a view illustrating the carbon sheet being detached from its sheet of paper preparatory to making an erasure.
Figure 4:
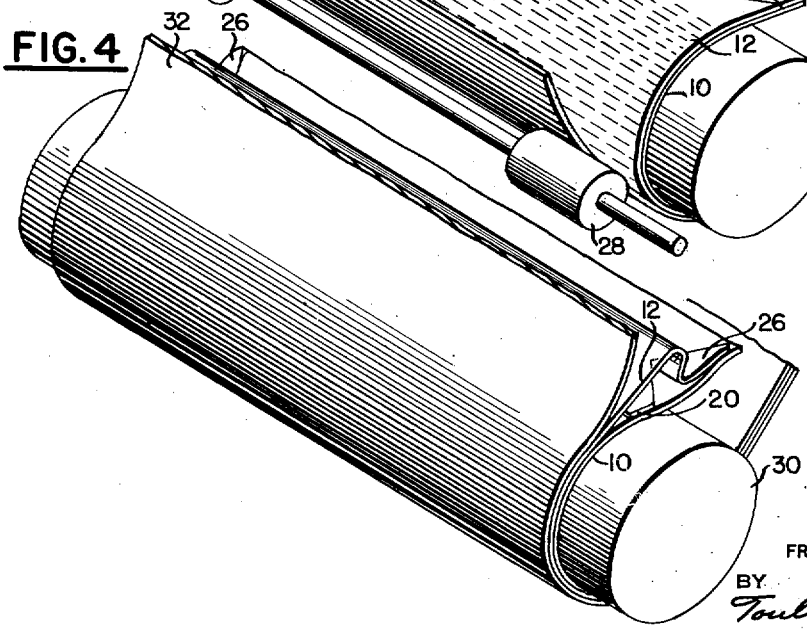
Figure 4 is a view showing the carbon sheet folded under and being used as a shield during an erasure.

The utility of the tabs 26 is better illustrated in Figures 2 through 4 wherein there is shown a platen of a machine and an original sheet and a set form according to this invention inserted therearound.

In Figure 2 the sheets are in writing position and in Figure 3 the bail 28 has been moved outwardly from the platen 30 to permit the original sheet 32 to be spaced from the set form.

Thereafter, the operator places his or her thumb on one of the tabs 26. When this is done a slight pressure will cause the incision to open and the nail of the thumb may then be slid under the carbon sheet and passed between the sheets along the full length thereof thereby severing the carbon sheet 12 from the sheet of paper 10. The tabs 26 are next folded forward on both sides of the carbon sheet for a purpose which will become more apparent hereinafter.

Then, to make the erasure, the sheet 12 is folded back, as shown in Figure 4, to bring the uncoated marginal portion 20 thereof under the point at which an erasure is to be made. The uncoated portion protects the second sheet from the carbon coating and the erasure may be made without the use of a shield. When the erasure has been made on the original and also on the sheet 10, the carbon sheet is replaced in its original position by grasping the now extended tabs 26 and pulling the carbon sheet back into its original position. Subsequent erasures may be made in the same manner except that it is not necessary to detach the carbon from its sheet or to fold the tabs 26. It will be apparent that this method of making erasures is convenient, requiring no shield or other means to protect the copy, may be accomplished without the operator's fingers becoming smudged, and does not dislocate the carbon and papers.

Figure 6:
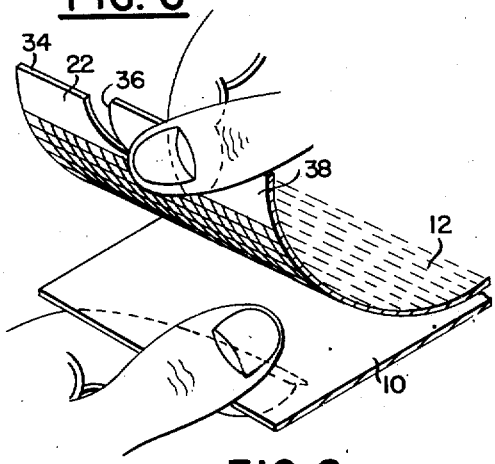
Figures 5 and 6 are fragmentary views showing the method of separating the carbon sheet from the paper sheet after the writing has been completed.
Figure 5:
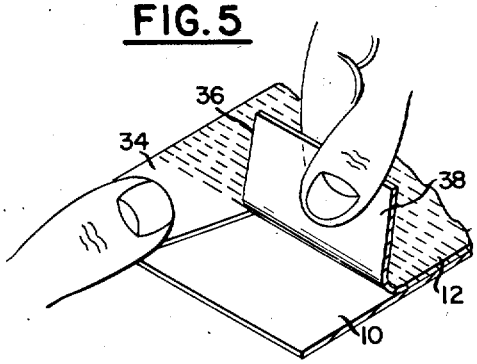

After the typing has been completed and the sheets are removed from the machine, the carbon sheet is separated from the paper in the manner illustrated in Figures 5 and 6.

When the paper is removed, the operator grasps the form at the extreme right or left with the thumb on one of the tabs 34 which is formed by the incisions 36 that extend into the uncoated margin 22. These incisions are preferably about 1" or 1⅛" in length and extend on about a 25° angle and are placed 1¼" from each edge of the carbon sheet. Preferably, the incisions are inclined toward the center of the paper from the edge for greater convenience in separating the carbon paper sheets.

After the operator has grasped the form as shown in Figure 5, the intermediate tab 38 between the incisions will be extended somewhat away from the paper sheet 10. This may then be grasped by the thumb and forefinger of the hand and then the thumb and forefinger which are grasping the form at the tab 34 may be shifted into their Figure 6 position where they grasp only the paper sheet 10. Then, with a separating motion of the hands, the carbon paper may be detached from its sheet. It will be evident that the separating of the carbon and the paper sheets may be accomplished without the smudging of the operator's fingers or of the paper and in a minimum of time.

While it is preferred to employ a one time carbon sheet in order to fully realize the advantages of this invention, it will be evident that a carbon sheet constructed according to this invention comprising the uncoated top and bottom margins with their associated incisions could be employed a number of times if desired. In either event the advantages associated with the uncoated margins and the incisions and tabs formed thereby would prevail.

It will also be evident that forms constructed according to this invention with the carbon sheet secured to the copy sheet would be easier to align and insert into a writing machine, that the letter head or other form employed would not be defaced or smudged by inserting or removing carbon sheets. Accordingly, a saving of time is realized and improved efficiency results for both experienced and inexperienced machine operators.

It will be understood that this invention is susceptible to modification in order to adopt it to different usages and conditions and, accordingly, it is desired to comprehend such modifications within this invention as may fall within the scope of the appended claims.

I claim:

1. In a set form including a paper sheet and a carbon sheet of substantially the same size; adhesive means securing said sheets together along the upper edges; uncoated marginal portions at the top and bottom of said carbon sheet extending completely across the width thereof; and diagonal incisions at each side of each of said uncoated marginal portions for facilitating the severing of said adhesive connection and the separating of the sheets.

2. In a set form, the combination of a paper sheet and a carbon sheet of the same size secured thereto by adhesive along their upper edges, the said carbon sheet comprising uncoated top and bottom marginal portions; a diagonal incision extending across the upper of said uncoated marginal portions from the edge of the carbon paper toward the center for permitting the thumb to be inserted between the sheets and to be passed therebetween for severing the said adhesive connection; and incisions extending across the said lower uncoated marignal portion adjacent either edge of the carbon paper but spaced therefrom to form thumb tabs whereby the sheet may be separated by first grasping both of the sheets by the said tab by one hand and thereafter grasping the sheets intermediate the tabs one with one hand and one with the other and pulling them apart.

3. As a new article of manufacture; a carbon sheet having uncoated portions extending thereacross at the top and bottom margins thereof; an incision extending diagonally into said upper margin from each side of said sheet; and other incisions extending across said other uncoated marginal portion from the lower edge of said sheet, said last mentioned incisions being adjacent the side edges of the carbon sheet but spaced therefrom to form thumb tabs at the lower corners of said sheet.

*4. In a set form, the combination of a paper sheet and a carbon sheet having their longitudinal edges substantially in alignment and secured together by adhesive along a transverse edge, the said carbon sheet having a diagonal slit in at least one longitudinal edge adjacent the adhesively secured transverse edge, said diagonal slit extending from the said one longitudinal edge of the carbon sheet toward the center thereof whereby to form in the carbon sheet an attached thumb tab adjacent the adhesively secured edge, said carbon sheet being positioned upon said paper sheet with the paper sheet providing a backing for said thumb tab whereby to permit insertion of an instrument between the sheets through the slit for severing the sheets along the transverse adhesively secured edges.*

*5. In a set form, the combination of a paper sheet and a carbon sheet having their longitudinal edges substantially in alignment and secured together by adhesive along a transverse edge, the said carbon sheet having a diagonal slit in each of said longitudinal edges adjacent the adhesively secured transverse edge, said diagonal slits extending from said longitudinal edges of the carbon sheet toward the center thereof whereby to form in the carbon sheet an attached thumb tab adjacent the adhesively secured edge, said carbon sheet being positioned upon said paper sheet with the paper sheet providing a backing for said thumb tab whereby to permit insertion of an instrument between the sheets through either of the slits for severing the sheets along the transverse adhesively secured edges.*

*6. In a set form, the combination of a paper sheet and a carbon sheet having their longitudinal edges substantially in alignment and secured together by adhesive along a transverse edge, the said carbon sheet having an uncoated marginal portion at the adhesively secured transverse edge thereof, a diagonal slit extending across said uncoated marginal portion from the edge of the carbon sheet toward the center thereof whereby to form in the carbon sheet an attached thumb tab adjacent the adhesively secured edge, said carbon sheet being positioned upon said paper sheet with the paper sheet providing a backing for said thumb tab whereby to permit insertion of an instrument between the sheets through the*

*slit for severing the sheets along the transverse adhesively secured edges.*

*7. In a set form, the combination of a paper sheet and a carbon sheet having their longitudinal edges substantially in alignment and secured together by adhesive along a transverse edge, the said carbon sheet having an uncoated marginal portion at the adhesively secured transverse edge thereof, a diagonal slit extending across said uncoated marginal portion from the edge of the carbon sheet toward the center thereof whereby to form in the carbon sheet an attached substantially triangular shaped thumb tab in said uncoated marginal portion for grasping between the fingers to separate the carbon sheet from the paper sheet, said carbon sheet being positioned upon said paper sheet with the paper sheet providing a backing for said thumb tab to permit insertion of an instrument between the sheets through the slit for severing the sheets along the transverse adhesively secured edges.*

FRANK J. HAUER.

REFERENCES CITED

The following references are of record in the file of this patent or the original patent.

UNITED STATES PATENTS

| Number | Name | Date |
|---|---|---|
| 2,178,878 | McAdams | Nov. 7, 1939 |
| 2,246,984 | Palmer | June 24, 1941 |
| 2,394,553 | Kerr | Feb. 12, 1946 |